United States Patent [19]
Bates et al.

[11] Patent Number: 5,416,700
[45] Date of Patent: May 16, 1995

[54] SCROLLING GEAR RATIO SELECTION CONTROL SYSTEM AND METHOD

[75] Inventors: Ian R. J. Bates, Huddersfield; John E. Stainton, Chorley; Robert S. Wheeler; Keith Wright, both of Preston, all of England

[73] Assignee: Eaton Corporation, Cleveland, Ohio

[21] Appl. No.: 104,699

[22] Filed: Aug. 11, 1993

[30] Foreign Application Priority Data

Aug. 27, 1992 [GB] United Kingdom ............. 9218273

[51] Int. Cl.⁶ ........................................ F16H 47/06
[52] U.S. Cl. .................... 364/424.1; 364/424.01; 364/426.04; 477/115; 477/97; 477/138; 477/176; 192/3.3; 192/3.31; 192/3.56; 192/3.58; 340/456; 340/462
[58] Field of Search ........... 364/424.1, 424.01, 426.04; 477/97, 169, 174, 176, 115, 138, 73–78, 131, 154–155, 63; 192/3.31, 3.3, 3.58, 3.51, 3.56, 3.58; 340/441, 456, 462

[56] References Cited

U.S. PATENT DOCUMENTS

| | | | |
|---|---|---|---|
| 3,628,642 | 12/1971 | Ravenel | 192/3.56 |
| 4,414,863 | 11/1983 | Heino | 477/63 |
| 4,714,144 | 12/1987 | Speranza | 364/424.1 |
| 4,873,637 | 10/1989 | Braun | 364/424.1 |
| 4,888,577 | 12/1989 | Dunkley et al. | 340/461 |
| 4,899,857 | 2/1990 | Tateno et al. | 477/73 |
| 4,913,269 | 4/1990 | Dunkley et al. | 192/3.63 |
| 4,933,850 | 6/1990 | Wheeler | 364/424.1 |
| 4,937,749 | 6/1990 | Dunkley et al. | 364/424.1 |
| 4,955,258 | 9/1990 | Ito et al. | 364/424.1 |
| 4,970,916 | 11/1990 | Narita | 364/424.1 |
| 5,081,588 | 1/1992 | Holmes et al. | 364/424.1 |
| 5,157,607 | 10/1992 | Stainton et al. | 364/424.1 |
| 5,265,018 | 11/1993 | Sokol et al. | 364/424.1 |
| 5,267,157 | 11/1993 | Churchill et al. | 364/424.1 |

*Primary Examiner*—Kevin J. Teska
*Assistant Examiner*—Jacques H. Louis-Jacques
*Attorney, Agent, or Firm*—Howard D. Gordon

[57] ABSTRACT

A control system and method for a semi-automatic mechanical transmission system (10) is provided for allowing operator request for a scrolling display of allowable ratios in either the upshift or downshift direction, and for a direct shift into the selected one of the displayed ratios. In one embodiment, retaining the control (1) lever in a displaced position for one or two seconds will initiate the scrolling display, while retaining the transmission engaged in the initial ratio, and subsequently release of the control lever to its centered position will cause a direct shift into the then displayed ratio.

24 Claims, 7 Drawing Sheets

SCROLLING GEAR RATIO SELECTION CONTROL SYSTEM AND METHOD

BACKGROUND OF THE INVENTION

Related Applications

The present application is related to patent applications 08/104,687, title START RATIO ENGAGEMENT SYSTEM AND METHOD; 08/104,698 titled START RATIO SELECTION CONTROL SYSTEM AND METHOD; and 07/935,937 titled START GEAR RATIO CONTROL SYSTEM AND METHOD, all,assigned to the assignee of this application, Eaton Corporation, and all effectively filed the same day as this application, Aug. 27, 1992.

1. Field of the Invention

The present invention relates to a control system and method for a semiautomatic mechanical transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts, including automatic control of the vehicle master clutch. In one embodiment a clutch pedal is provided and the master clutch operation is automated in all but start from stop situations. More particularly, the present invention relates to a system and method for controlling a semi-automatic mechanical transmission wherein movement to and retention of the shift selection lever in the upshift or downshift direction will allow the operator to (i) see a scrolling display of available gear ratios and subsequent release of the shift selection lever will result in a direct shift to the then displayed ratio or, alternatively, (ii) will cause the transmission to disengage the initially engaged ratio and scroll through the available ratios in the selected direction, initiating but usually not completing engagement of the ratio being dwelled upon until the (a) shift selector lever is released to its centered position or (b) the last available ratio in the selected direction is reached, whereupon the then currently initiated engagement operation is allowed to complete.

2. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic, hydraulic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065; 4,361,060; 5,050,079 and 5,109,729, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof. Moreover, many vehicle operators like to control the selection of the gear ratios, particularly since they can see and/or know the nature of the road ahead and/or of the load being carried.

The above drawbacks have been minimized by providing a semi-automatic mechanical transmission control wherein automatic changing between a plurality of gear ratios is provided while normally permitting the driver to choose when to make a particular gear ratio change and whether to select the immediately consecutive ratio up or down or, by repetitive pulses in a given direction, to skip one or more ratios. Furthermore, the semi-automatic control system prohibits engagement of a driver selected higher ratio, i.e. an upshift, that would cause the engine speed to decrease below the idle speed, i.e. would cause stalling and/or over-stressing at low speeds of the engine, and of a lower ratio, i.e. a downshift, if such a change would cause over-speeding of the engine. It is noted that with manual mechanical transmissions such over-speeding of the engine can occur due to a improper downshift even though the engine speed may be governed against accelerating above the governed engine RPM. Examples of such a semi-automatic transmission control can be seen by reference to U.S. Pat. Nos. 4,648,290; 4,800,360; 4,930,081 and 4,930,078, the disclosures of which are incorporated herein by reference.

While the above-described semi-automatic mechanical transmission control does provide a very desirable semi-automatic control, the control was subject to improvement. Selection of a direct single or skip shifts by repetitive pulses or movements of the shift selection lever is highly advantageous, however, the requirement of calculating the number of required movements, and of performing same, may be somewhat burdensome. This was particularly a concern in modern mechanical transmissions for heavy-duty vehicles which may have 9, 10, 12, 13, 16 or 18 forward speed ratios and wherein any one of seven ratios may be allowable start ratios under certain conditions. Examples of such multi-speed mechanical transmissions may be seen by reference to U.S. Pat. Nos. 4,735,109 and 4,754,665, the disclosures of which are incorporated herein by reference.

SUMMARY OF THE INVENTION

In accordance with the present invention, the drawbacks of the prior art semi-automatic mechanical transmission control have been minimized or eliminated by the provision of a control and control method which is responsive to retention of the shift selector in a given direction of displacement to cause the transmission to remain in the currently engaged ratio and the display to scroll in the given direction through the allowable engageable ratios and, upon release of the shift selection lever to the centered position, will perform a direct shift from the currently engaged ratio to the currently displayed ratio.

Alternatively, retention of the lever in a given direction may initiate a scrolling series of initiated, but not usually completed, engagements of the sequentially related ratios until the lever is released and/or the most displaced allowable ratio is reached, at which time the then initiated ratio engagement will be completed and the display will inform the operator of the engaged gear ratio.

Accordingly, it is an object of the present invention to provide a new and improved control system/method for semi-automatic mechanical transmissions having a control for automatically determining allowable up and down shifts from a given gear ratio, preferably for automatically displaying same, for automatically executing such permissible gear ratio changes upon selector lever manual selection thereof by the vehicle operator, and wherein the operator can request a scrolling display of available gear ratios by retaining the selector lever in a displaced position and direct shifting into the currently displayed ratio by allowing the shift lever to return to the nondisplaced position thereof. Alternatively, by retaining the shift selector lever in a displaced position, the operator may initiate a scrolling series of initiated engagements of allowable ratios and full engagement of the ratio engaged or being engaged at the time the lever is released to return to the nondisplaced position thereof.

This and other objects and advantages of the present invention will become apparent from a reading of the following description of the preferred embodiments taken in connection with the attached drawings.

DESCRIPTION OF THE PREFERRED EMBODIMENT

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and-/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are hereby incorporated by reference.

The present invention is applicable, in principle, to the semi-automatic control of any type of mechanical change gear transmission adaptable for providing output signals to and receiving command signals from electro-pneumatic control devices. However, the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No, 82303586.2, published Feb. 9, 1983 (EP-A-0071353) and European Patent Application No. 83307061.8, published Sep. 5, 1984 (EP-A-0117342) and U.S. Pat. No. 4,735,109. Transmissions of the type illustrated in above-mentioned U.S. Pat. No. 4,754,665 may be advantageously used in connection with the present invention.

The semi-automatic transmission system to which the present invention is particularly advantageously related, is described an illustrated in European Patent application 85305072.2, published Feb. 5, 1986 (EP-A-0 170 465) and U.S. Pat. No. 4,648,290.

Figure 1:
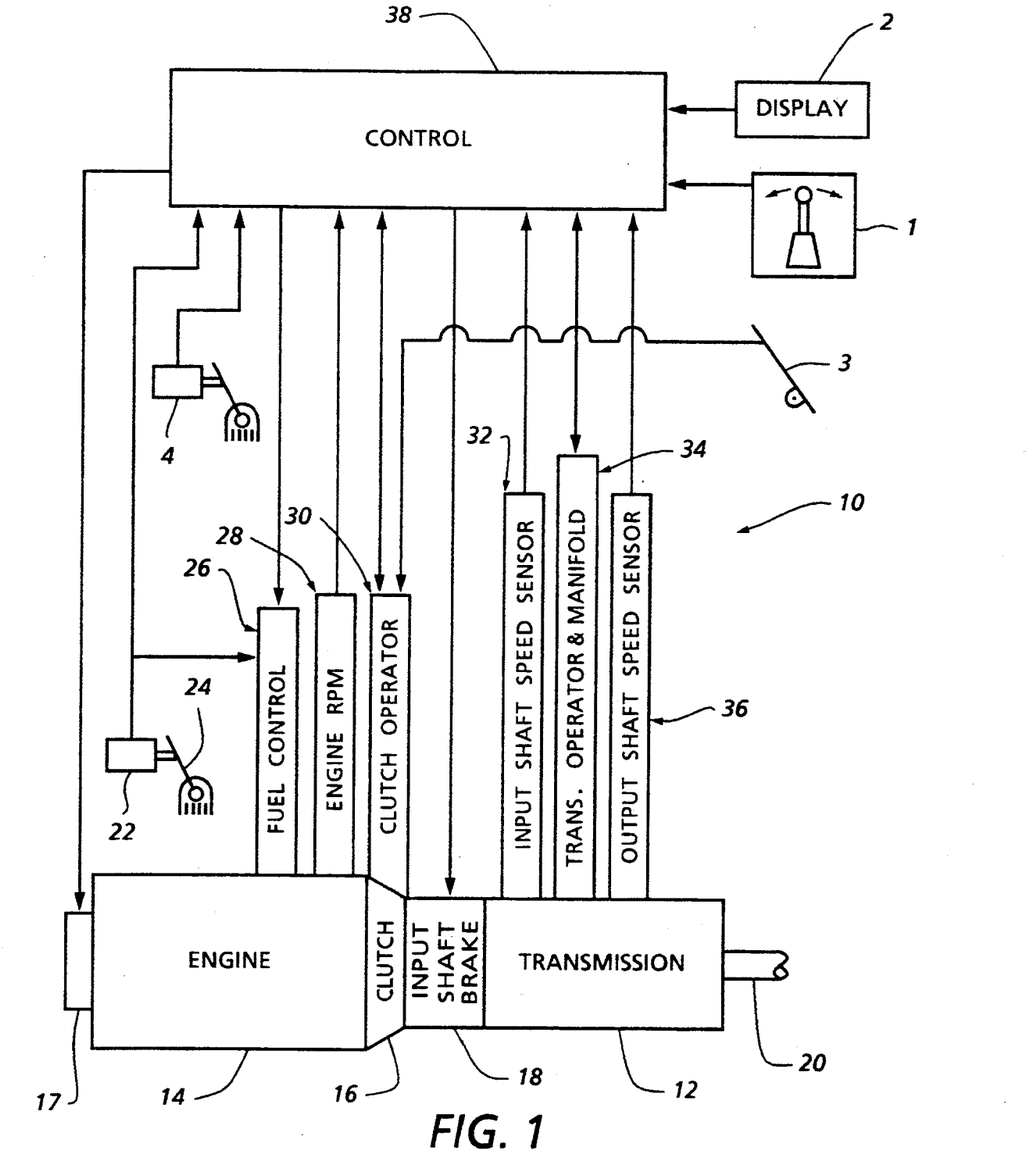
FIG. 1 is a schematic illustration of the semi-automatic mechanical change gear transmission system of the present invention.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground speed and engine speed is an indication of transmission input shaft speed, and visa versa, especially if clutch 16 is nonslippingly engaged.

The throttle position sensor 24 may be of the type illustrated in U.S. Pat. No. 4,922,425, the disclosure of which is incorporated by reference, which will indicate the presence or absence of the operator's foot on the throttle pedal as well as displacement of the throttle pedal.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are hereby incorporated by reference.

For control of vehicle SAMT systems 10, such as the systems illustrated in above-mentioned U.S. Pat. Nos. 4,648,290; 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%).

Figure 2:
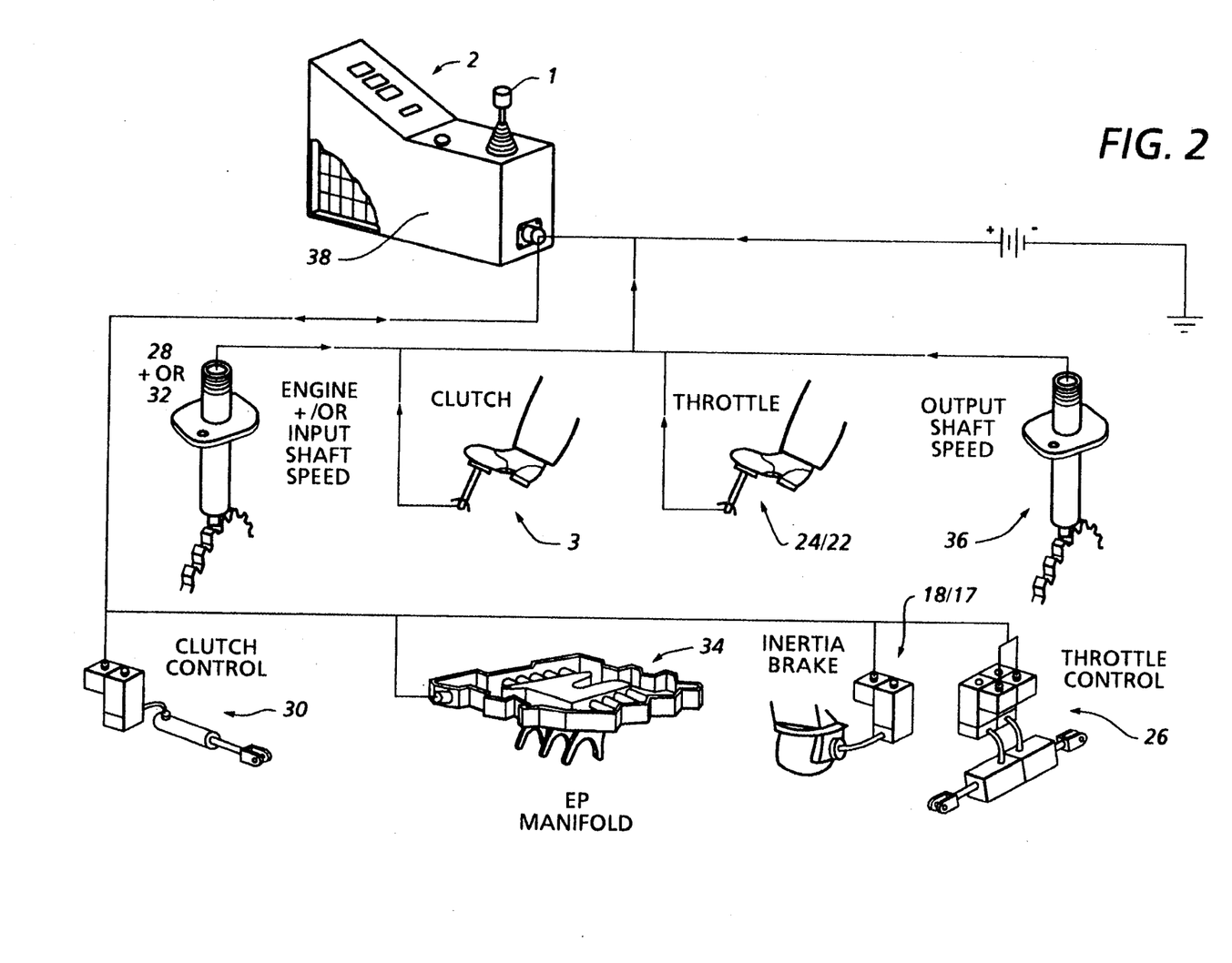
FIG. 2 is a schematic illustration of the control system of the semi-automatic transmission of the present invention.

Control logic circuits, sensors, and actuators for the transmission system as disclosed in FIGS. 1 and 2, may be as disclosed in above-mentioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to control the supply of fuel to the engine 14 to achieve rapid synchronous rotation preparatory to a shift, clutch control via operator 30, and ratio shifting via transmission operator 34. The transmission operator 34 may also be of the "X-Y" type as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures all of which are incorporated herein by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3A:
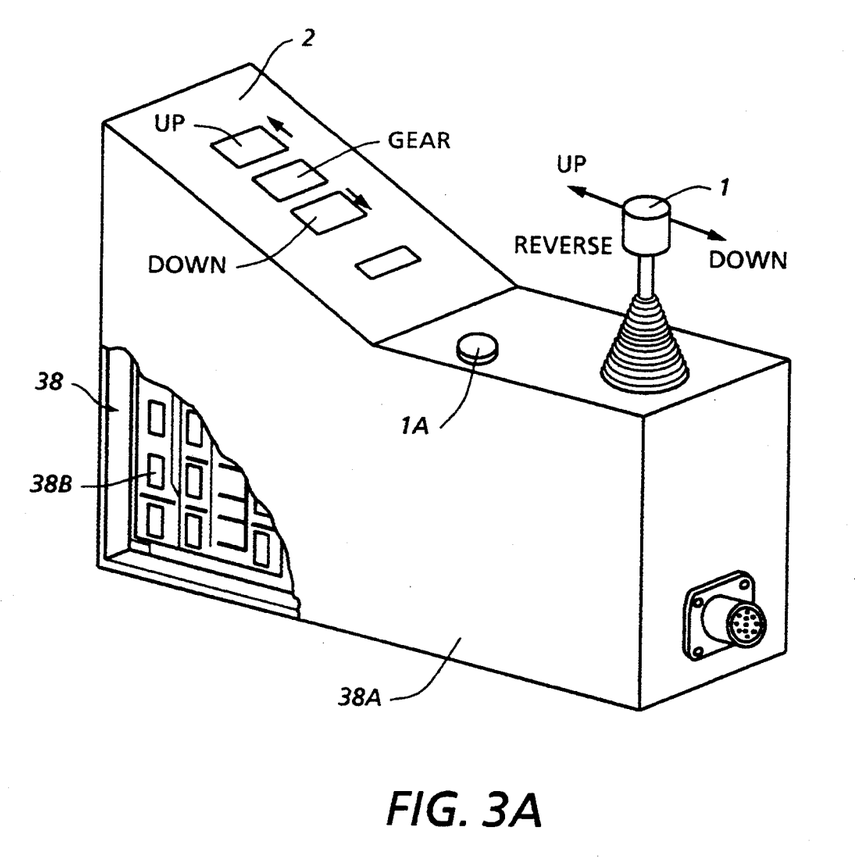
FIG. 3A is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2'", the shift select lever 1, an optional reverse enable button 1 A, as well as a central processing unit electronic circuitry 38B.

The schematics of the control system of the semi-automatic mechanical transmission system 10 are also illustrated in FIG. 2.

Figure 3B:
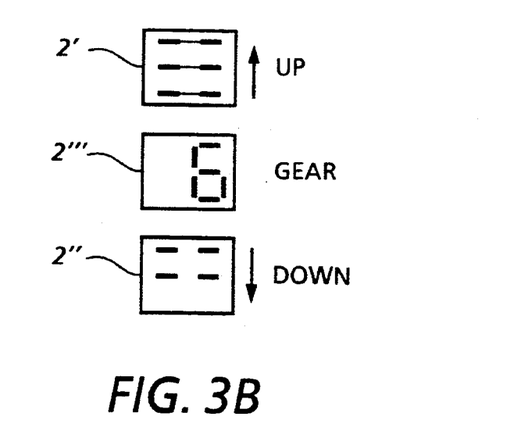
FIG. 3B is an enlarged view of a portion of the display illustrated in FIG. 3.

Referring to FIG. 3B, the display 2 includes upshift indicator section 2', downshift indicator section 2" and currently engaged gear ratio indicator section 2'". As illustrated, the currently engaged gear ratio display section 2'" is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2'" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, then allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section, i.e. compound shifts, are equally simple for the driver to achieve as are those involving only the auxiliary section, i.e. a split shift. In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system of the present invention that, whenever the vehicle is brought to a complete stop, the clutch 16 is disengaged and the transmission is engaged in a relatively high gear ratio and the lever 1 is moved in the downshift direction once, the control will automatically shift transmission 12 to neutral or to a preselected starting gear, which may involve skip-shifting over a large plurality of intervening gear ratios. By way of example, in a twelve forward speed transmission, the permissible starting ratios may be the first through fifth gear. Once in a start ratio another lever movement in the downshift direction will shift the transmission one ratio lower and another movement in the upshift direction will shift the transmission one ratio higher. The operator, at rest or in motion, can always select a gear ratio from those permitted. The manual clutch pedal, if utilized, is only intended for use preparatory to stopping to disengage the transmission and avoid stalling and during starting from rest in any of the permissible starting gear ratios.

The preselected start gear may be preset and fixed, may be selectable by the operator, may be determined by the electronic control unit in view of inputs and predetermined logic rules or may simply be the last actually utilized start ratio, A single movement or pulse of the lever is a movement of the lever from the centered position to a displaced position, in either the upshift or downshift direction, and then the immediate release of the lever allowing the lever to return to the centered position thereof. If the control lever 1 is retained in the displaced position for more than a predetermined period of time (for example, for more than one (1) or two (2) seconds, an alternate control logic may be utilized.

As indicated previously, a twelve forward speed transmission may have up to five allowable start ratios and, with the vehicle in motion, may have six or more allowable engageable ratios. An eighteen forward speed transmission may have up to seven allowable start ratios and, while the vehicle is in motion, may have seven or more allowably engaged ratios. While selection of a direct skip shift by a series of repeatable shift lever movements of the selection lever 1 is highly advantageous, the requirement of calculating the number of required movements, and of performing same, may be somewhat burdensome.

Figure 4A:
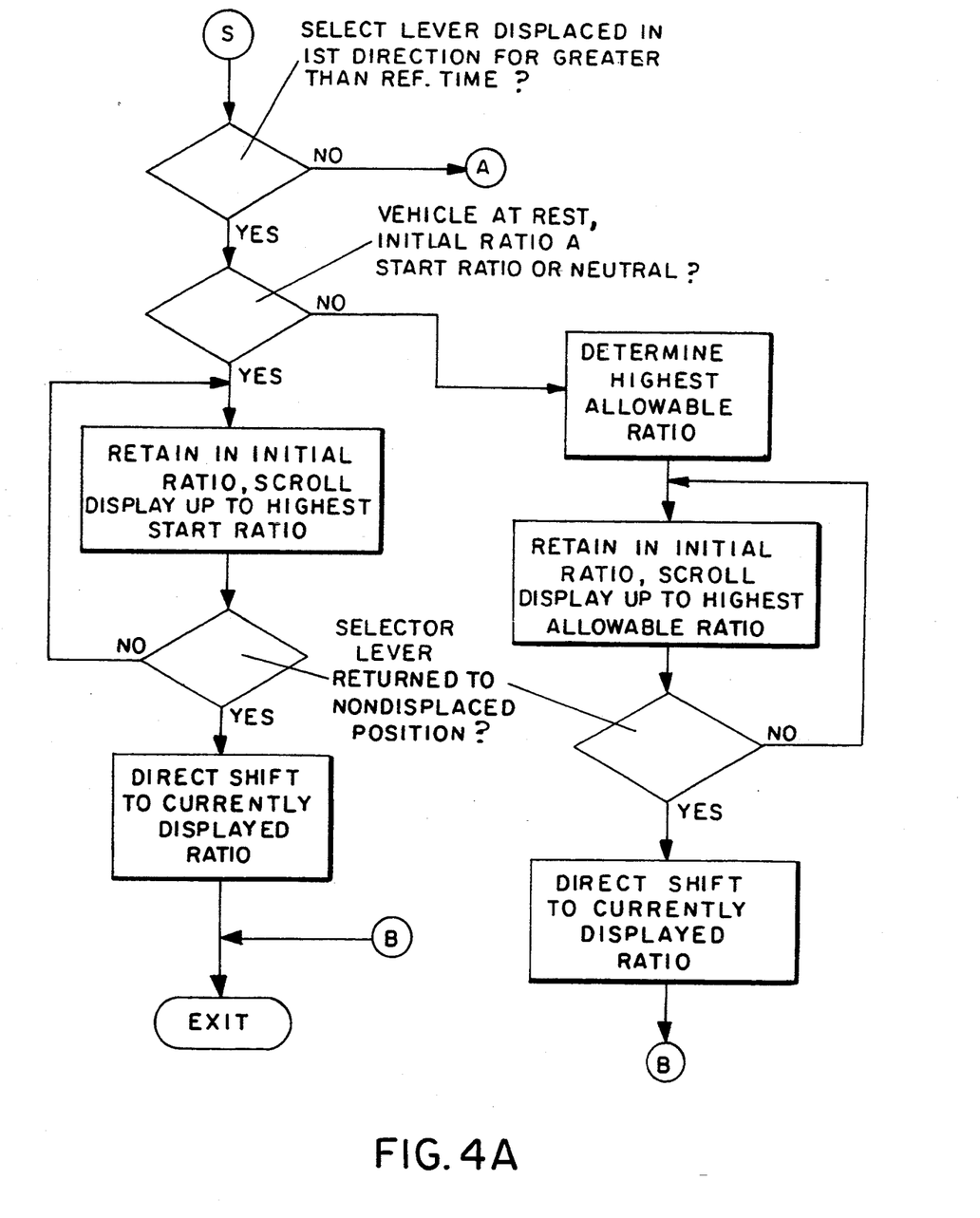
FIGS. 4A and 4B are schematic illustrations, in the form of a flow chart, of the control system/method of the present invention.
Figure 4B:
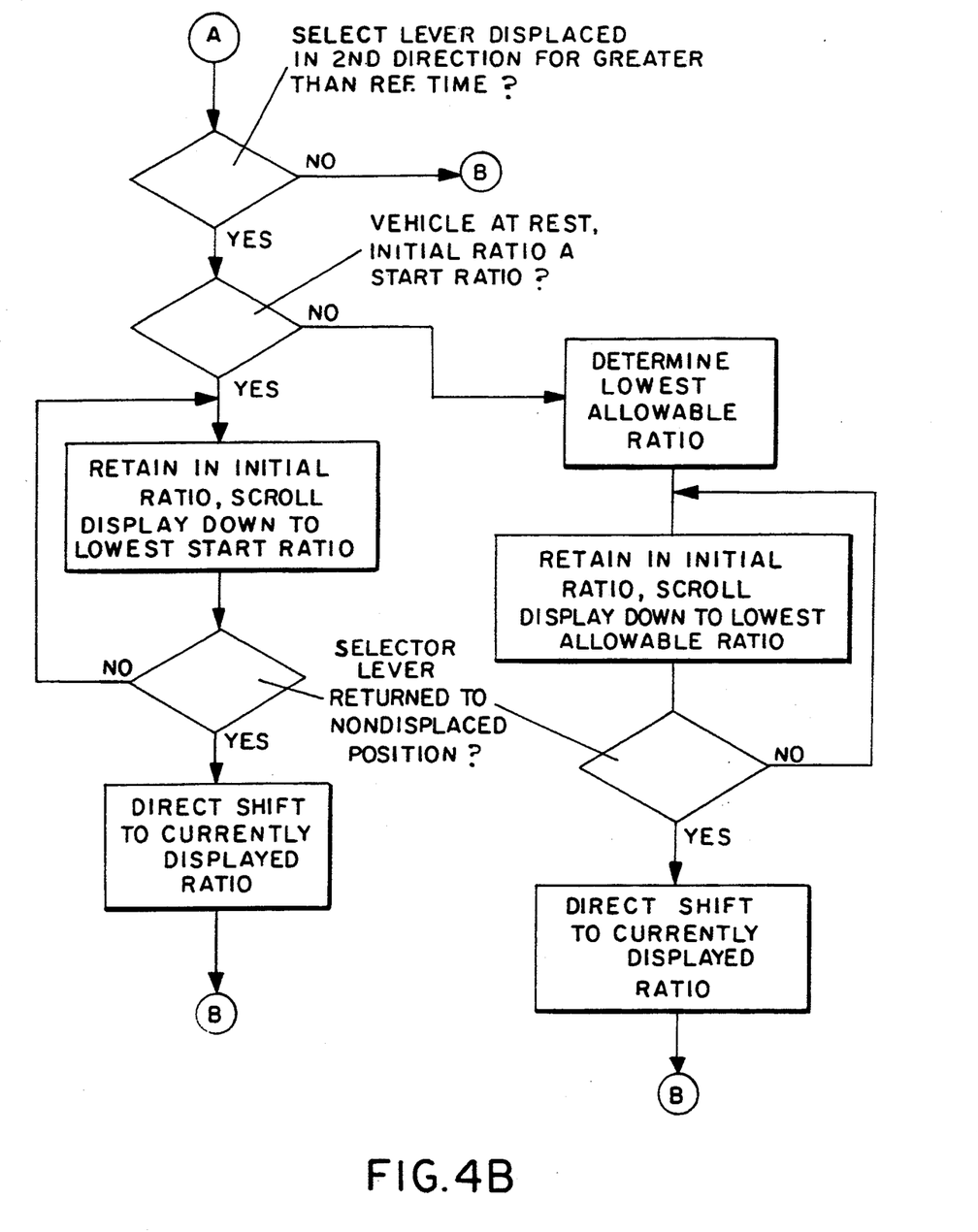

According to one embodiment of the present invention, as illustrated in FIGS. 4A and 4B, if the operator displaces and retains the shift selection lever 1 in a given direction (usually for greater than a reference time such as one (1) or two (2) seconds), then a scrolling logic mode of operation will be implemented.

In the scrolling mode of operation, the currently engaged ratio is maintained and the display section 2''' will scroll in the given direction through the then allowable ratios, and will cause direct shifting into the ratio displayed at the time the operator releases the selector lever and allows it to return to and remain in the nondisplaced position thereof. Preferably, in start conditions, if the initial ratio is a start ratio, or neutral, the allowably engaged ratios will be all of the available start ratios.

As the display scrolls up or down from the currently engaged ratio, it will increment to, and dwell in, each sequentially related ratio. Preferably the dwell time will be sufficient (about 1 to 2 seconds) to allow the operator to select the then displayed ratio. Should the operator inadvertantly scroll past the desired ratio, he or she may simply move the lever through the nondisplaced position and directly to the displaced position in the other direction thereof which, if the lever is retained in that position, will cause scrolling in the other direction from the then currently displayed ratio. For example, if a driver scrolls from fourth (4th) to ninth (9th) when seventh (7th) is desired, by moving the lever to and retaining it in the downshift direction, the display will scroll back down from ninth (9th) to eighth (8th) to seventh (7th) at which time the lever may be released to return to its centered position and a direct skip shift from fourth (4th) to seventh (7th) will be performed.

By the above-described procedure, the vehicle operator can, with a single movement and retention of the control lever in a given direction (i.e. the upshift or downshift direction) scroll through the available allowable ratios displaced in that direction from the initially engaged ratio, and directly engage a selected one of those ratios by simply releasing the control lever when that selected ratio is displayed.

As an optional feature, the displayed ratio may flash, a scroll mode indicator may be lighted or the like to provide an additional indication of operation in the scrolling mode.

Figure 5A:
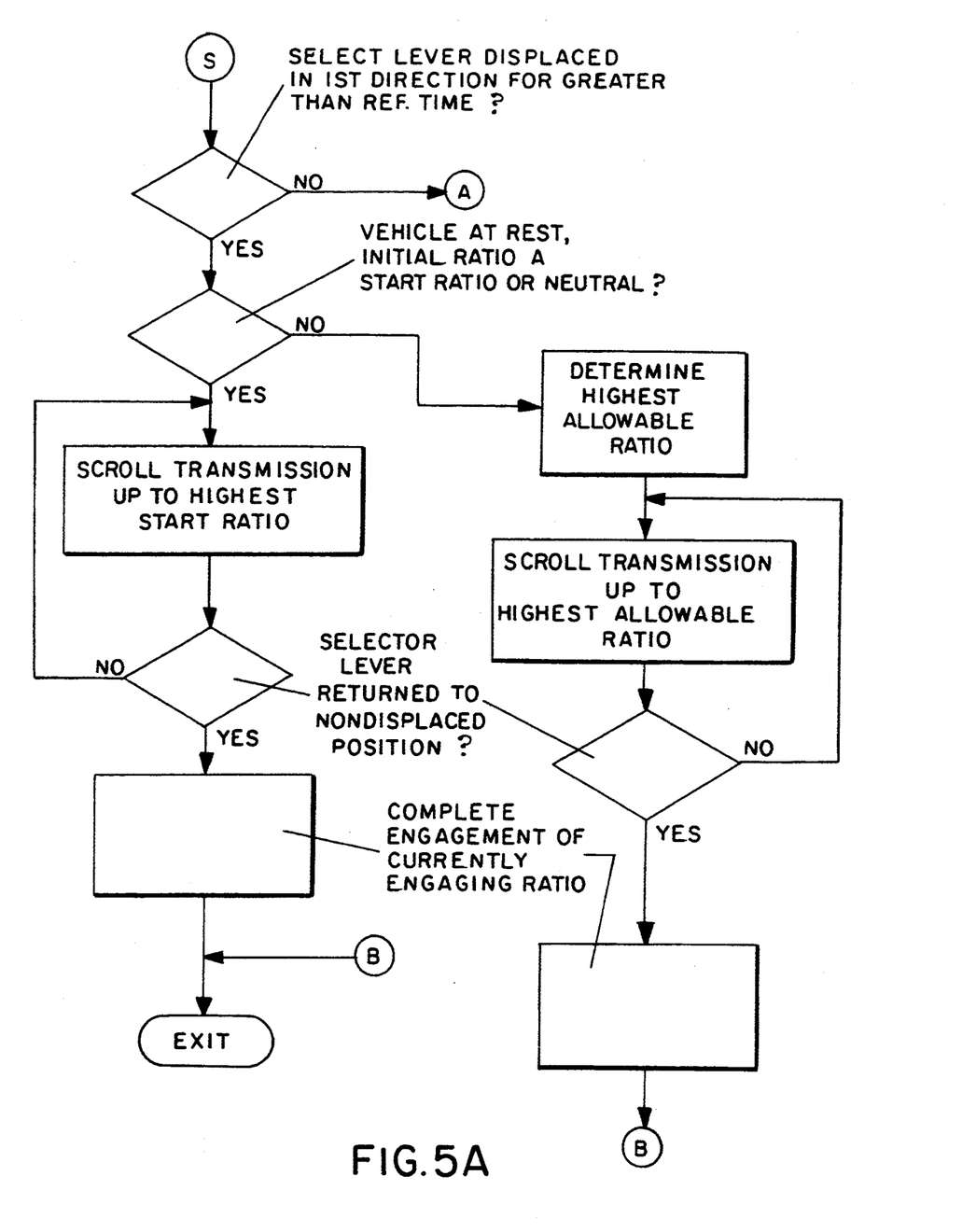
FIGS. 5A and 5B are schematic illustrations, in the form of a flow chart, of an alternate embodiment of the present invention.
Figure 5B:
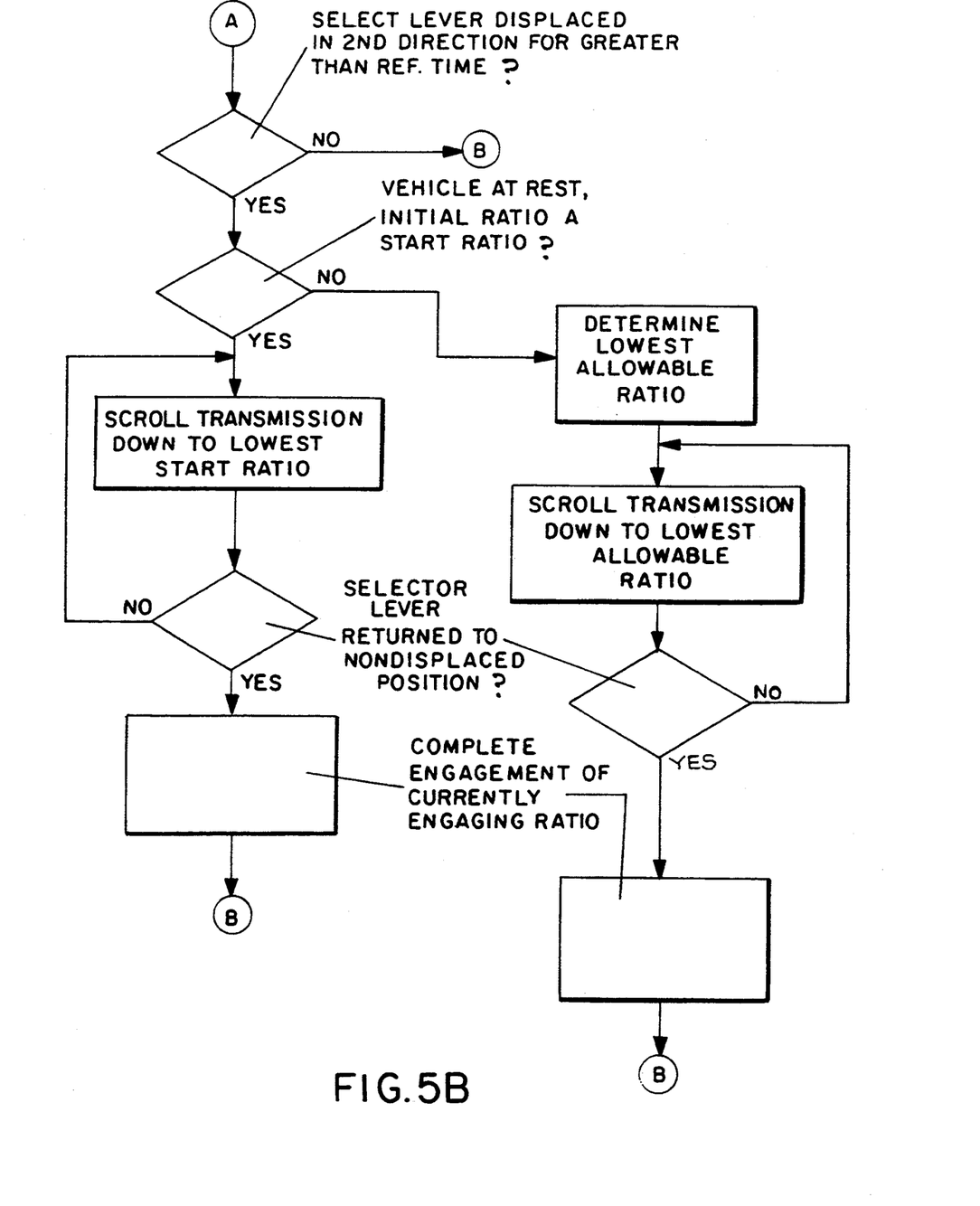

According to an alternate embodiment of the present invention, as seen in FIGS. 5A and 5B, in the scrolling mode of operation, the transmission will scroll upwards or downwards through the allowable gear ratios, initiating engagement of each next sequentially displaced allowable ratio during the dwell time (about one (1) second), until the shift election lever is released or the most displaced allowable ratio is reached, then allowing the then engaging ratio to be fully engaged. The display will preferably inform the operator of the gear ratio currently being engaged and then of the gear ratio fully engaged. As the dwell time during scrolling is relatively short, full engagement of the scrolled through ratios is usually not achieved.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system (10) comprising a multi-speed change gear mechanical transmission (12) having a lowest grouping of gear ratios (1st–5th) suitable for start from stop operation, a manually operated shift selection lever (1) moveable in a first direction from a centered position to select upshifts and in a second direction from said centered position to select downshifts from the currently engaged gear ratio, a display (2) for displaying at least one gear ratio, and a central processing unit (38) for receiving inputs including inputs indicative of transmission input shaft rotational speed, of vehicle speed and of operation of said shift selection lever and for processing same according to predetermined logic rules to determine the currently engaged gear ratio and allowably engaged gear ratios and to issue command output signals to non-manually controlled operators including a transmission operator (34) and to said display, said processing unit sensing operation of said shift selection lever including the direction of movement thereof and the number of displacements of said shift selection lever within a first predetermined period of time from said centered position, and, in a first mode of operation, determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction; said method comprising:

automatically selecting operation in a scrolling mode of operation when said shift selection lever is displaced in a one of said first and said second directions from said centered position for greater than a second predetermined period of time, operation in said scrolling mode of operation comprising:
(i) retaining said transmission in the currently engaged ratio;
(ii) during continuing displacement of said shift selection lever in said one of said first and second directions of displacement, causing said display to repeatedly display the next sequentially displaced ratio in said one of said first and second directions for a predetermined dwell time until the display scrolls to and continuously displays the most displaced allowably engaged ratio in said one of said directions; and
(iii) causing a direct shift from the currently engaged ratio to the ratio displayed when the shift selection lever is allowed to return to and remain in the centered position thereof.

2. The method of claim 1 wherein said allowably engageable ratios are said lowest grouping if said vehicle is at rest and said initial ratio is within said lowest grouping.

3. The method of claim 2 wherein said allowable engageable ratios are said lowest grouping if said vehicle is at rest and said initial ratio is neutral.

4. The method of claim 1 wherein said allowable engageable ratios are said lowest grouping if said vehicle is at rest and said initial ratio is neutral.

5. The method of claim 1 wherein said allowably engageable ratios include transmission reverse ratios if said vehicle is at rest and said initial ratio is one of a reverse ratio and neutral.

6. The system of claim 1 wherein said allowably engageable ratios include transmission reverse ratios if said vehicle is at rest and said initial ratio is one of a reverse ratio and neutral.

7. A method of controlling a semi-automatic mechanical change gear transmission system (10) comprising a multi-speed change gear mechanical transmission (12), a display (2) for displaying at least one gear ratio (2'''), a manually operated shift selection lever (1) moveable in a first direction from a centered position to select upshifts and in a second direction from said centered position to select downshifts from the currently engaged gear ratio, a central processing unit (38) for receiving inputs including inputs indicative of transmission input shaft rotational speed, of vehicle speed and of operation of said shift selection lever and for processing same according to predetermined logic rules to determine the currently engaged ratio and allowably engaged gear ratios and to issue command output signals to non-manually controlled operators including a transmission operator (34) and to said display, said processing unit sensing operation of said shift selection lever including the direction of movement thereof; said method comprising:

automatically selecting operation in a scrolling mode of operation when said shift selection lever is displaced in a one of said first and said second directions from said centered position for greater than a predetermined period of time, operation in said scrolling mode of operation comprising:

(i) retaining said transmission in the currently engaged ratio;

(ii) during continuing displacement of said shift selection lever in said one of said first and second directions of displacement, retaining said transmission engaged in the currently engaged ratio and causing said display to repeatedly display the next sequentially displaced ratios in said one of said first and second directions for a predetermined dwell time; and (iii) causing a direct shift from the currently engaged ratio to the ratio displayed when the shift selection lever is allowed to return to and remain in the centered position thereof.

8. The method of claim 7 wherein said predetermined time is in the range of one or two seconds.

9. A system for controlling a semi-automatic mechanical change gear transmission system (10) comprising a multi-speed change gear mechanical transmission (12) having a lowest grouping of gear ratios (1st–5th) suitable for start from stop operation, a manually operated shift selection lever (1) moveable in a first direction from a centered position to select upshifts and in a second direction from said centered position to select downshifts from the currently engaged gear ratio, a display (2) for displaying at least one gear ratio, and a central processing unit (38) for receiving inputs including inputs indicative of transmission input shaft rotational speed, of vehicle speed and of operation of said shift selection lever and for processing same according to predetermined logic rules to determine the currently engaged ratio and allowably engaged gear ratios and to issue command output signals to non-manually controlled operators including a transmission operator (34) and to said display, said processing unit sensing operation of said shift selection lever including the direction of movement thereof and the number of displacements of said lever within a first predetermined period of time from said centered position, and, in a first mode of operation, determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction; said system comprising:

means for automatically selecting operation in a scrolling mode of operation when said shift selection lever is displaced in a one of said first and said second directions from said centered position for greater than a second predetermined period of time, operation in said scrolling mode of operation comprising:

(i) retaining said transmission in the currently engaged ratio;

(ii) during continuing displacement of said selection lever in said one of said first and second directions of displacement, causing said display to repeatedly display the next sequentially displaced ratio in said one of said first and second directions for a predetermined dwell time until the display scrolls to and continuously displays the most displaced allowably engaged ratio in said one of said directions; and (iii) causing a direct shift from the currently engaged ratio to the ratio displayed when the shift selection lever is allowed to return to and remain in the centered position thereof.

10. The system of claim 9 wherein said allowably engageable ratios are said lowest grouping if said vehicle is at rest and said initial ratio is within said lowest grouping.

11. The system of claim 10 wherein said allowable engageable ratios are said lowest grouping if said vehicle is at rest and said initial ratio is neutral.

12. The system of claim 9 wherein said allowable engageable ratios are said lowest grouping if said vehicle is at rest and said initial ratio is neutral.

13. A system for controlling a semi-automatic mechanical change gear transmission system (10) comprising a multi-speed change gear mechanical transmission (12), a display (2) for displaying at least one gear ratio (2'''), a manually operated shift selection lever (1) moveable in a first direction from a centered position to select upshifts and in a second direction from said centered position to select downshifts from the currently engaged gear ratio, a central processing unit (38) for receiving inputs including inputs indicative of transmission input shaft rotational speed, of vehicle speed and of operation of said shift selection lever and for processing same according to predetermined logic rules to determine the currently engaged ratio and allowably engaged gear ratios and to issue command output signals to non-manually controlled operators including a transmission operator (34) and to said display, said processing unit sensing operation of said shift selection lever including the direction of movement thereof; said system comprising:

means for automatically selecting operation in a scrolling mode of operation when said shift selection lever is displaced in a one of said first and said second directions from said centered position for greater than a predetermined period of time, operation in said scrolling mode of operation comprising:

(i) retaining said transmission in the currently engaged ratio;

(ii) during continuing displacement of said selection lever in said one of said first and second directions of displacement, retaining said transmission engaged in the currently engaged ratio and causing said display to repeatedly display the next sequentially displaced ratios in said one of said first and second directions for a predetermined dwell time; and (iii) causing a direct shift from the currently engaged ratio to the ratio displayed when the shift selection lever is allowed to return to and remain in the centered position thereof.

14. The system of claim 13 wherein said predetermined time is in the rand of one or two seconds.

15. A method of controlling a semi-automatic mechanical change gear transmission system (10) comprising a multi-speed change gear mechanical transmission (12) having a lowest grouping of gear ratios (1st–5th) suitable for start from stop operation, a manually operated shift selection lever (1) moveable in a first direction from a centered position to select upshifts and in a second direction from said centered position to select downshifts from the currently engaged gear ratio, a display (2) for displaying at least one gear ratio, and a central processing unit (38) for receiving inputs including inputs indicative of transmission input shaft rotational speed, of vehicle speed and of operation of said shift selection lever and for processing same according to predetermined logic rules to determine the currently engaged ratio and allowably engaged gear ratios and to issue command output signals to non-manually controlled operators including a transmission operator (34) and to said display, said processing unit sensing operation of said shift selection lever including the direction of movement thereof and the number of displacements of said lever within a first predetermined period of time from said centered position, and, in a first mode of operation, determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction; said method comprising:

automatically selecting operation in a scrolling mode of operation when said shift selection lever is displaced in a one of said first and said second directions from said centered position for greater than a second predetermined period of time, operation in said scrolling mode of operation comprising:
(i) during continuing placement of said shift selection lever in said one of said first and second directions of displacement, causing said transmission operator to repeatedly initiate engagement of the next sequentially displaced ratio in said one of said first and second directions for a predetermined dwell time until the transmission operator scrolls to the most displaced allowably engaged ratio in said one of said directions; and
(ii) causing completed engagement of the ratio being engaged when the shift selection lever is allowed to return to and remain in the centered position thereof.

16. The method of claim 15 wherein said allowably engageable ratios are said lowest grouping if said vehicle is at rest and said initial ratio is within said lowest grouping.

17. The method of claim 15 wherein said allowable engageable ratios are said lowest grouping if said vehicle is at rest and said initial ratio is neutral.

18. The method of claim 15 wherein said allowably engageable ratios include transmission reverse ratios if said vehicle is at rest and said initial ratio is one of a reverse ratio and neutral.

19. A method of controlling a semi-automatic mechanical change gear transmission system (10) comprising a multi-speed change gear mechanical transmission (12), a manually operated shift selection lever (1) moveable in a first direction from a centered position to select upshifts and in a second direction from said centered position to select downshifts from the currently engaged gear ratio, a central processing unit (38) for receiving inputs including inputs indicative of transmission input shaft rotational speed, of vehicle speed and of operation of said shift selection lever and for processing same according to predetermined logic rules to determine the currently engaged ratio and allowably engaged gear ratios and to issue command output signals to non-manually controlled operators including a transmission operator (34), said processing unit sensing operation of said shift selection lever including the direction of movement thereof; said method comprising:

automatically selecting operation in a scrolling mode of operation when said shift selection lever is displaced in a one of said first and said second directions from said centered position for greater than a predetermined period of time, operation in said scrolling mode of operation comprising:
(i) during continuing displacement of said shift selection lever in said one of said first and second directions of displacement, causing said transmission operator to repeatedly initiate engagement of the next sequentially displaced ratio in said one of said first and second directions for a predetermined dwell time; and
(ii) causing complete engagement of the ratio being engaged when the shift selector lever is allowed to return to and remain in the centered position thereof.

20. The method of claim 19 wherein said scrolling mode of operation additionally comprises:
(iii) causing complete engagement of the most displaced allowably engaged ratio upon initiation of engagement thereof.

21. The method of claim 19 wherein said predetermined time is in the range of one to two seconds.

22. A system for controlling a semi-automatic mechanical change gear transmission system (10) comprising a multi-speed change gear mechanical transmission (12), a manually operated shift selection lever (1) moveable in a first direction from a centered position to select upshifts and in a second direction from said centered position to select downshifts from the currently engaged gear ratio, a central processing unit (38) for receiving inputs including inputs indicative of transmission input shaft rotational speed, of vehicle speed and of operation of said shift selection lever and for processing same according to predetermined logic rules to determine the currently engaged ratio and allowably engaged gear ratios and to issue command output signals to non-manually controlled operators including a transmission operator (34), said processing unit sensing operation of said shift selection lever including the direction of movement thereof; said system comprising:

means for automatically selecting operation in a scrolling mode of operation when said shift selection lever is displaced in a one of said first and said second directions from said centered position for greater than a predetermined period of time, operation in said scrolling mode of operation comprising:
(i) during continuing displacement of said shift selection lever in said one of said first and second directions of displacement, causing said transmission operator to repeatedly initiate engagement of the next sequentially displaced ratio in said one of said first and second directions for a predetermined dwell time; and
(ii) causing complete engagement of the ratio being engaged when the shift selector lever is allowed to return to and remain in the centered position thereof.

23. The system of claim 22 wherein said scrolling mode of operation additionally comprises:
(iii) causing complete engagement of the most displaced allowably engaged ratio upon initiation of engagement thereof.

24. The system of claim 22 wherein said predetermined time is in the range of one to two seconds.

* * * * *